United States Patent [19]

Higgins

[11] 4,063,956

[45] Dec. 20, 1977

[54] HEAT STABLE MONOCLINIC BISMUTH VANADATE PIGMENT

[75] Inventor: James Francis Higgins, Livingston, N.J.

[73] Assignee: E. I. Du Pont de Nemours and Company, Wilmington, Del.

[21] Appl. No.: 723,957

[22] Filed: Sept. 16, 1976

[51] Int. Cl.$^2$ .............................................. C09C 1/00
[52] U.S. Cl. .............................. 106/288 B; 106/308 B
[58] Field of Search ........................ 106/288 B, 308 B

[56] References Cited

U.S. PATENT DOCUMENTS

| 3,639,133 | 2/1972 | Lenton | 106/308 B |
| 3,798,045 | 3/1974 | Jackson | 106/308 B |
| 3,928,057 | 12/1975 | DeColibus | 106/308 B |

*Primary Examiner*—Patrick P. Garvin
*Assistant Examiner*—J. V. Howard

[57] ABSTRACT

Bright primrose yellow monoclinic bismuth vanadate pigment is pretreated with one or more hydrous metal oxides and is then coated with dense, amorphous silica to obtain a pigment with superior heat stability in thermoplastics and acid resistance in finishes.

9 Claims, No Drawings

HEAT STABLE MONOCLINIC BISMUTH VANADATE PIGMENT

BACKGROUND OF THE INVENTION

It has recently been discovered that a pure monoclinic form of bismuth vanadate is a bright primrose yellow pigment which is nontoxic, possesses good strength, high intensity and good lightfastness, exhibits no bleed in organic solvents and paints and has high hiding.

This invention provides a monoclinic bismuth vanadate pigment with thermal stability and hydrochloric acid resistance superior to known bismuth vanadate pigment.

SUMMARY OF THE INVENTION

This invention relates to a primrose yellow monoclinic bismuth vanadate pigment containing from 0.2 to 20% of a precoat of one or more porous hydrous oxides selected from the group consisting of the hydrous oxides of aluminum, silicon, titanium, boron, manganese, tin, hafnium, thorium, columbium, tantalum, zinc, molybdenum, barium, strontium, nickel and antimony.

This invention also relates to a primrose yellow pigment containing from 0.2 to 20% of a precoat of one or more porous hydrous oxides as described above and also containing from 2 to 40% by weight of a continuous coating of dense, amorphous silica and from 0 to 5% by weight alumina ($Al_2O_3$).

This invention also relates to a process for coating a monoclinic bismuth vanadate with one or more hydrous metal oxides comprising:

A. Slurrying the bismuth vanadate in water,

B. Adjusting the pH of the slurry to a pH of from 4.0 to 11.0,

C. Heating the slurry of step B, with agitation, to a temperature of from 40° F. (4.44° C.) to 212° F. (100° C.), D. Adding a source of one or more hydrous oxides to the slurry equivalent to a total of from 0.2 to 20% of hydrous metal oxide, based on the weight of bismuth vanadate, with the proviso that when more than one source of hydrous metal oxide is employed said source of hydrous metal oxides may be added sequentially, E. Adjusting the slurry of a pH of from 4.0 to 10 with the proviso that when more than one source of hydrous metal oxide is added in step D the pH of the slurry may, if desired, be adjusted to from 4 to 10 between additions of said hydrous oxide source, F. Filtering, washing substantially salt-free and drying the coated pigment.

This invention also relates to the process as described above followed by the steps of:

G. Adding sodium silicate and sodium hydroxide to the slurry to adjust the pH to 9 or above, H. Heating the slurry to from 185° F. (85° C.) to 212° F. (100° C.), I. Simultaneously and slowly adding sodium silicate and an acid selected from the group consisting of sulfuric acid ad hydrochloric acid while maintaining the slurry at a temperature of from 194° F. (90° C.) to 212° F. (100° C.), J. Adding aluminum sulfate to the slurry in an amount sufficient to provide from 0 to 5%, preferably from 0.25 to 2%, of $Al_2O_3$ on the silica coating, K. Filtering, washing substantially salt-free and drying the resultant pigment.

DESCRIPTION OF THE INVENTION

This invention relates to bright primrose yellow monoclinic bismuth vanadate which is treated to produce a pigment of superior heat stability in thermoplastics and in some cases a pigment having enhanced resistance to acid spotting in surface coating systems such as alkyds, thermoplastic acrylic lacquers and thermosetting acrylic enamels.

Monoclinic bismuth vanadate pigment as used herein will be understood to mean bismuth vanadate which is entirely in the monoclinic crystal phase as determined using X-ray diffraction; which exhibits an increase in reflectance from 450 to 525 nm of at least about 65 units using Type I illumination; which has a green filter reflectance in paint of about 60%; and which has a masstone lightfastness in paint such that it loses 11% or less reflectance during 44 hours Fade-Ometer ® exposure.

The bismuth vanadate may be prepared by mixing a solution of $Bi(NO_3)_3 \cdot 5H_2O$ in nitric acid with a solution of alkali vanadate, preferably $Na_3VO_4$, in an aqueous base selected from sodium hydroxide and potassium hydroxide while controlling the mixing conditions to assure equimolar incremental combination of the solutions under turbulent conditions to obtain bismuth vanadate gel suspended in a solution containing dissolved alkali nitrate; the molar ratio of $Bi^{3+}$ to $VO_4^{3-}$ in this suspension is from about 0.90:1.00 to 1.10:1.00 and the normalities of the acid and base solutions are adjusted prior to mixing so that the pH of the suspension will be about 1.0 to 11.0 and preferably 1.5 to 2.0; adjusting, if necessary, the pH of the suspension to about 2.2–6.0 with an alkali hydroxide selected from sodium hydroxide or potassium hydroxide or as the case may be with an acid selected from nitric acid or sulfuric acid; separating the gel from the reaction mixture; washing the gel with water until it contains about 10% or less alkali nitrate based on the theoretical yield of bismuth vanadate. The gel is then heated in water at a temperature of about 100° C. for about one or two hours to convert the gel to pigmentary monoclinic bismuth vanadate. During this heating the pH of the suspension must be monitored and maintained between 2.2 and 6.0 with suitable acid or base. After the heating stage is completed the pigment is filtered.

Monoclinic bismuth vanadate pigment is a bright primrose yellow in color and is of high value as a pigment. This invention is directed to an enhanced monoclinic bismuth vanadate pigment which, when subjected to specific processing conditions after preparation, is modified to possess improved thermal and acid stability without adverse effect on its tinctorial properties.

As indicated above the treatment consists of applying one or more hydrous oxides to the pigment followed by a coating with dense, amorphous silica and, if desired, alumina. The hydrous oxides employed in the pre-silica treatment are the oxides of aluminum, silicon, titanium, boron, manganese, tin, hafnium, thorium, columbium, tantalum, zinc, molybdenum, barium, strontium, nickel and antimony. Of these the preferred hydrous oxides are those of aluminum, silicon, titanium and boron, either singly or combined. These oxides are deposited on the bismuth vanadate in an aqueous slurry that is generally at a low pH and in some unexplained manner appears to improve the adhesion of the dense, amorphous silica coating with the result that a superior pigment is produced.

The total hydrous oxides in the pre-silica coating are present in an amount from 0.2% by weight of the bismuth vanadate to 20% by weight of bismuth vanadate with a pretreatment of from 2 to 6% being preferred.

The dense, amorphous silica coating will be present in an amount of from 2 to 40% by weight of the bismuth vanadate with a coating of 15 to 35% being preferred.

The final alumina treatment is optional but does provide a pigment with desirable processing properties when 5% or less is deposited following the deposition of the dense, amorphous silica coating.

As will be demonstrated below, the hydrous oxide pretreatment improves the bismuth vanadate's receptivity to the silica coating, but the improvements to heat stability and to acid resistance are not of equal magnitude with the various pretreatments. For example, an $Al_2O_3$ pretreatment provides a bismuth vanadate with superior acid stain properties when coated with dense, amorphous silica and dispersed in a thermoplastic acrylic lacquer finish, but the heat stability of this pigment is slightly decreased. However, when more than one hydrous oxide is employed as a pre-coat the heat stability of the dense, amorphous silica coated product is significantly enhanced and the acid stability is retained. Therefore, some testing within the bounds of this teaching may be necessary to obtain a pigment with the desired balance of heat stability and/or acid stability for a given end use and in a specific system.

It will, of course, be understood that the benefits of this invention are not seen until a dense, amorphous silica coating is applied following the application of the porous hydrous oxide and it is for this reason that such hydrous oxide is referred to herein as a pre-coat.

The following examples are presented to illustrate this invention. Parts and percentages are by weight of bismuth vanadate unless otherwise specified.

EXAMPLE 1

An aqueous slurry of monoclinic bismuth vanadate pigment is prepared by adding 225 g. of $BiVO_4$ to 3,000 ml of water which is at a temperature of 80° F (26.7° C) and then mixed well. The slurry is heated to a temperature of 205° F (96.1° C) with steam and is adjusted to a pH of from 6.5 to 7.0 followed by the addition of 20.0 g of alum [$Al_2(SO_4)_3.16 H_2O$]. The slurry is stirred for 5 minutes and the pH is seen to be 2.95. The pH of the slurry is then adjusted to 6.5 with 10% sodium carbonate solution. It is filtered and washed to a resistivity of 5,000 ohm/cm with water, and dried in an oven overnight at 220° F (104.4° C). The bismuth vanadate product is coated with 1.4% of $Al_2O_3$.

EXAMPLE 1A

The pigments prepared above are then coated with dense silica in accordance with the following procedure: 150 parts of precoated bismuth vanadate prepared as above, 20 parts of sodium silicate (29.5% $SiO_2$ in which $SiO_2/Na_2O$ = 3.25, such as Du Pont Technical Grade No. 9) and 447 parts of water are homogenized into a smooth paste which paste is then further diluted with 790 parts of water for a total of about 1237 parts of water. The pH of the resulting slurry is adjusted to 11.5 with a 5% aqueous solution of sodium hydroxide and this slurry is then heated to 90° C.

In separate containers, the following solutions are prepared:

1. 115 parts of the above-described sodium silicate is added to 530 parts of water, 2. 17.3 parts of 96.0% sulfuric acid is added to 800 parts of water.

These solutions are then slowly and simultaneously added to the above pigment slurry at the following ratio: solution (1) is added over a period of three hours and solution (2) is added over a period of 3¾ hours. During this addition, the slurry temperature is maintained in the range of 194° F (90° C) to 203° F (95° C). Upon completion of the addition of solutions (1) and (2) to the pigment slurry an aqueous solution containing 10.0 parts aluminum sulfate in 100 parts of water is added to the slurry and stirred for five minutes. The pH of the slurry is then adjusted to 4.0 to 4.2 with 5% aqueous sodium hydroxide. The slurry is filtered, washed to a resistance of 5,000 ohm/cm and then dried overnight at 220° F (104.4° C) to produce a silica-coated, bright primrose yellow monoclinic bismuth vanadate pigment having superior heat stability in thermoplastics and resistance to spotting by hydrochloric acid when dispersed in thermoplastic acrylic lacquer.

EXAMPLE 2

An aqueous slurry of monoclinic bismuth vanadate pigment is prepared by adding 225 g of bismuth vanadate to 3,000 ml of water at a temperature of 80° F (26.7° C) and then mixing well. The slurry is then heated to a temperature of 205° F (96.1° C) with steam and the pH is adjusted to from 6.5 to 7.0. Twenty grams of alum is then added to the slurry and stirred for five minutes. Then 3.25g of $TiO_2$ as titanylsulfate is added, the slurry is stirred for ten seconds and the pH of the slurry is adjusted to 6.5 with 10% aqueous sodium carbonate. The slurry is filtered and washed to a resistivity of 5,000 ohm/cm and is then dried in an oven at 220° F (104.4° C) overnight. The resultant bismuth vanadate pigment has a coating of about 1.4% $Al_2O_3$ and 1.4% $TiO_2$.

The precoated bismuch vanadate pigment is then treated in accordance with the procedure of Example 1A to produce silica coated, bright primrose yellow monoclinic bismuch vanadate pigment having superior heat stability in thermoplastics and resistance to spotting by hydrochloric acid when dispersed in thermoplastic acrylic lacquer.

EXAMPLE 3

A slurry containing 225 g of pigmentary monoclinic bismuth vanadate, 3,000 ml of water and 20 g of alum is precipitated as described in Example 2. Then 15 g of the sodium silicate solution of Example 1 is added and the slurry is stirred for five minutes. $TiO_2$ (3.25 g) as titanyl sulfate is added, the slurry is stirred for 10 seconds and the pH is adjusted to 6.5 with 10% aqueous sodium carbonate. The slurry is then filtered and washed to a resistance of 5,000 ohm/cm and is dried overnight at 220° F (104.4° C) in an oven. The pigmentary bismuth vanadate is coated with 1.4% $Al_2O_3$, 1.4% $TiO_2$ and 1.97% $SiO_2$.

The precoated bismuth vanadate pigment is then treated in accordance with the procedure of Example 1A to produce silica coated, bright primrose yellow monoclinic bismuth vanadate pigment having superior heat stability in thermoplastics and resistance to spotting by hydrochloric acid when dispersed in thermoplastic acrylic lacquer.

EXAMPLE 4

A slurry containing 225 g of pigmentary monoclinic bismuth vanadate, 3,000 ml of water and 20 g of alum is precipitated as described in Example 2. Then 15 g of sodium silicate solution of Example 1 is added and the slurry is stirred for five minutes. To this stirred slurry is then added 12.0 g of boron trioxide ($B_2O_3$) and the slurry is stirred for five minutes after which 3.25 g of $TiO_2$, as titanyl sulfate, is added and stirred for ten minutes. The slurry is adjusted to a pH of 6.5 with 10% aqueous sodium carbonate, filtered, washed to 5,000 ohm/cm and dried in an oven overnight at 220° F (104.4° C). The resultant bismuth vanadate pigment has a coating of 1.4% $Al_2O_3$, 1.4% $TiO_2$ and 1.97% $SiO_2$.

The precoated bismuth vanadate pigment is then treated in accordance with the procedure of Example 1A to produce silica coated, bright primrose yellow monoclinic bismuth vanadate pigment having superior heat stability in thermoplastics and resistance to spotting by hydrochloric acid when dispersed in thermoplastic acrylic lacquer.

To test for heat stability the pigments of this invention and bismuth vanadate which has not been pre-treated but is encapsulated with dense, amorphous silica are each mixed with solid granular polystyrene and placed in a closed one-pint can which is subjected to can rolling for about 45 minutes. After can rolling the material is two-roll milled into sheets. The sheets are placed in an extruder and heated at 315 ± 10° C. for 20 minutes and extruded into a mold. To assess the heat stability the color of the chip so obtained is compared with the other similarly prepared chips. In the following Table an arbitrary numerical rating has been assigned to characterize heat stability with the number "1" signifying that little or no color darkening occurs and a number "13" indicating severe color darkening has occurred, with intermediate numbers indicating relative stability within this range.

Stability against attack by hydrochloric acid is tested by preparing a paint such as a thermoplastic acrylic lacquer, spraying steel panels to a 3 mil thickness and spotting with 0.5, 1, 2 and 4% HCl for 24 hours at constant (room) temperature and observing film and color deterioration. In the Table below the samples with the highest numbers are most stable to acid. A rating of 80 is assigned if no film color deterioration occurs.

TABLE

| Pigment | Heat Stability | Acid Stability |
| --- | --- | --- |
| Control * | 9 | 48 |
| Example 1A | 12 | 52 |
| Example 2 | 6 | 50 |
| Example 3 | 1 | 48 |
| Example 4 | 2 | 48 |

* Monoclinic bismuth vanadate pigment coated with dense, amorphous silica in same manner as used in Example 1A but without pre-coat employed in Examples 1 to 4.

What is claimed is:

1. Improved monoclinic bismuth vanadate pigment consisting essentially of monoclinic bismuth vanadate precoated with from 0.2 to 20% by weight of a hydrous metal oxide, a second coat of dense, amorphous silica in an amount of from 2 to 40% by weight and from 0 to 5% by weight of $Al_2O_3$ deposited thereon.

2. The pigment of claim 1 in which the hydrous oxide in the pre-coat is one or more hydrous oxides selected from the group consisting of aluminum, silicon, titanium, boron, manganese, tin, hafnium, thorium, columbium, tantalum, zinc, molybdenum, barium, strontium, nickel and antimony.

3. The pigment of claim 1 in which the hydrous oxide in the pre-coat is one or more hydrous oxides of aluminum, silicon, titanium, and boron.

4. The pigment of claim 2 in which the pre-coat is present in an amount of from 2 to 6% by weight.

5. The pigment of claim 3 in which the pre-coat is present in an amount of from 2 to 6% by weight.

6. The pigment of claim 4 in which the dense, amorphous silica coat is present in an amount of from 15 to 35% by weight.

7. The pigment of claim 5 in which the dense, amorphous silica coat is present in an amount of from 5 to 25% by weight.

8. A process for preparing an improved monoclinic bismuth vanadate pigment which comprises:
   A. Slurrying the bismuth vanadate in water,
   B. Adjusting the pH of the slurry to from 4 to 11,
   C. Heating the slurry to a temperature of from 40° F. to 212° F.,
   D. Adding a source of one or more hydrous oxides to the slurry equivalent to a total of from 0.2 to 20% of hydrous metal oxide, based on the weight of bismuth vanadate, with the proviso that when more than one source of hydrous metal oxide is employed said source of hydrous metal oxides may be added sequentially,
   E. Adjusting the slurry to a pH of from 4.0 to 10.1 with the proviso that when more than one source of hydrous metal oxide is added in step D the pH of the slurry may, if desired, be adjusted to from 4 to 10 between additions of said hydrous oxide source,
   F. Filtering, washing substantially salt-free and drying the coated pigment.

9. A process for preparing an improved monoclinic bismuth vanadate pigment which comprises:
   A. Slurrying the bismuth vanadate in water,
   B. Adjusting the pH of the slurry to a pH of from 4.0 to 11.0,
   C. Heating the slurry of step B, with agitation, to a temperature of from 40° to 212° F.,
   D. Adding a source of one or more hydrous oxides to the slurry equivalent to a total of from 0.2 to 20% of hydrous metal oxide, based on the weight of bismuth vanadate, with the proviso that when more than one source of hydrous metal oxide is employed said source of hydrous metal oxides may be added sequentially,
   E. Adjusting the slurry to a pH of from 4.0 to 10.1 with the proviso that when more than one source of hydrous metal oxide is added in step D the pH of the slurry may, if desired, be adjusted to from 4 to 10 between additions of said hydrous oxide source,
   F. Filtering, washing substantially salt-free and drying the coated pigment,
   G. Adding sodium silicate and sodium hydroxide to the slurry to adjust the pH to 9 or above,
   H. Heating the slurry to from 185° F. to 212° F.,
   I. Simultaneously and slowly adding sodium silicate and an acid selected from the group consisting of sulfuric acid and hydrochloric acid while maintaining the slurry at a temperature of from 194° F. to 212° F.,
   J. Adding aluminum sulfate to the slurry in an amount sufficient to provide from 0 to 5%, preferably from 0.25 to 2%, of $Al_2O_3$ on the silica coating,
   K. Filtering, washing substantially salt-free and drying the resultant pigment.

* * * * *